United States Patent
Imoto et al.

(10) Patent No.: US 6,444,362 B2
(45) Date of Patent: Sep. 3, 2002

(54) HYDROGEN ABSORBING ALLOY POWDER AND PROCESS FOR PRODUCING SAME

(75) Inventors: Teruhiko Imoto, Katano; Yoshinori Matsuura, Hirakata; Nobuyuki Higashiyama, Mino; Mamoru Kimoto, Hirakata; Mitsuzo Nogami, Takatsuki; Ikuo Yonezu; Koji Nishio, both of Hirataka, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/833,632

(22) Filed: Apr. 13, 2001

Related U.S. Application Data

(62) Division of application No. 09/147,482, filed as application No. PCT/JP98/00324 on Jan. 26, 1998, now Pat. No. 6,238,822.

(30) Foreign Application Priority Data

Jan. 31, 1997 (JP) ............................................... 9-17995

(51) Int. Cl.$^7$ ................................................ H01M 4/62
(52) U.S. Cl. .................. 429/218.2; 429/223; 429/231.3
(58) Field of Search ............................ 429/218.2, 223, 429/231.3, 224, 221, 231.5; 252/62.55, 513, 521.2; 420/900

(56) References Cited

U.S. PATENT DOCUMENTS

| | | | | |
|---|---|---|---|---|
| 3,850,694 A | * | 11/1974 | Dunlop et al. | ................. 429/21 |
| 5,077,149 A | * | 12/1991 | Ikoma et al. | ............... 29/623.5 |
| 5,629,000 A | * | 5/1997 | Matsuura et al. | ........... 29/623.5 |
| 6,248,475 B1 | * | 6/2001 | Hayashida et al. | ......... 420/900 |
| 6,329,100 B1 | * | 12/2001 | Imoto et al. | ................ 420/900 |

* cited by examiner

Primary Examiner—Tom Dunn
Assistant Examiner—Jonathan Johnson
(74) Attorney, Agent, or Firm—Rader, Fishman & Grauer

(57) ABSTRACT

The invention provides a hydrogen absorbing alloy electrode obtained by the step P1 of preparing a hydrogen absorbing alloy powder containing cobalt and nickel, the step P2 of subjecting the surfaces of the alloy particles to a reduction treatment with high-temperature hydrogen by holding the powder in a high-temperature hydrogen atmosphere under the conditions of temperature, pressure and time sufficient to reduce oxides formed in a surface layer portion of each of the alloy particles, not melting the alloy particles and not permitting the alloy particles to absorb hydrogen, the step P3 of treating the resulting powder with an acid or alkali by immersing the powder in an acid or alkaline aqueous solution, followed by suction filtration, washing with water and drying, and the step P4 of applying the resulting power to an electrically conductive substrate and shaping the substrate in the form of the electrode. The electrode thus provided has higher activity than conventionally.

6 Claims, 7 Drawing Sheets

FIG. 5

| COMPONENT ELEMENT | La | Ce | Pr | Nd | Ni | Co | Al | Mn |
|---|---|---|---|---|---|---|---|---|
| SECOND METAL-RICH LAYER (atm %) | 0.02 | 0.04 | 0.00 | 0.00 | 78.93 | 19.11 | 0.80 | 1.10 |
| FIRST METAL-RICH LAYER (atm %) | 3.53 | 5.16 | 0.31 | 1.01 | 65.13 | 16.05 | 2.30 | 6.51 |

FIG. 7

| ALLOY ELECTRODE | ALLOY PREPARING METHOD | REDUCTION TREATMENT | TREATMENT AFTER REDUCTION TREATMENT | INITIAL DISCHARGE CAPACITY OF TEST CELL (DISCHARGE CAPACITY 1) mAh/g | INITIAL DISCHARGE CAPACITY OF ALKALINE BATTERY (DISCHARGE CAPACITY 2) mAh | RESISTANCE VALUE OF POWDER mΩ/(g·cm$^2$) |
|---|---|---|---|---|---|---|
| A1 | Ar ARC FURNACE | YES | UNTREATED | 285 | 820 | 0.708 |
| A2 | Ar ARC FURNACE | YES | WITH ACID | 295 | 860 | 0.737 |
| A3 | Ar ARC FURNACE | YES | WITH ALKALI | 290 | 855 | 0.796 |
| A4 | ATOMIZING | YES | UNTREATED | 292 | 840 | 0.767 |
| A5 | ATOMIZING | YES | WITH ACID | 299 | 865 | 0.796 |
| A6 | ATOMIZING | YES | WITH ALKALI | 296 | 855 | 0.885 |
| B1 | Ar ARC FURNACE | NO | UNTREATED | 222 | 620 | 1.003 |
| B2 | Ar ARC FURNACE | NO | WITH ACID | 246 | 675 | 1.032 |
| B3 | Ar ARC FURNACE | NO | WITH ALKALI | 232 | 640 | 1.062 |
| B4 | ATOMIZING | NO | UNTREATED | 170 | 580 | 1.032 |
| B5 | ATOMIZING | NO | WITH ACID | 221 | 620 | 1.062 |
| B6 | ATOMIZING | NO | WITH ALKALI | 202 | 610 | 1.091 |

FIG. 8

| ALLOY PREPARING METHOD | TREATMENT AFTER REDUCTION TREATMENT | TEMPERATURE FOR REDUCTION TREATMENT (°C) | INITIAL DISCHARGE CAPACITY OF TEST CELL (DISCHARGE CAPACITY 1) (mAh/g) | INITIAL DISCHARGE CAPACITY OF ALKALINE BATTERY (DISCHARGE CAPACITY 2) (mAh/g) |
|---|---|---|---|---|
| Ar ARC FURNACE | UNTREATED | 50 | 250 | 680 |
| Ar ARC FURNACE | UNTREATED | 100 | 285 | 820 |
| Ar ARC FURNACE | UNTREATED | 300 | 285 | 820 |
| Ar ARC FURNACE | UNTREATED | 500 | 286 | 825 |
| Ar ARC FURNACE | UNTREATED | 700 | 285 | 825 |
| Ar ARC FURNACE | UNTREATED | 900 | 284 | 820 |
| Ar ARC FURNACE | UNTREATED | 950 | 255 | 675 |
| ATOMIZING | UNTREATED | 50 | 225 | 630 |
| ATOMIZING | UNTREATED | 100 | 292 | 835 |
| ATOMIZING | UNTREATED | 300 | 292 | 840 |
| ATOMIZING | UNTREATED | 500 | 291 | 840 |
| ATOMIZING | UNTREATED | 700 | 290 | 840 |
| ATOMIZING | UNTREATED | 900 | 288 | 835 |
| ATOMIZING | UNTREATED | 950 | 224 | 625 |

HYDROGEN ABSORBING ALLOY POWDER AND PROCESS FOR PRODUCING SAME

This is a Division of application Ser. No. 09/147,482 filed Jan. 7, 1999 now U.S. Pat. No. 6,238,822, which is a 371 of PCT/JP98/00324, filed Jan. 26, 1998. The disclosure of the prior application(s) is hereby incorporated by reference in its entirety.

TECHNICAL FIELD

The present invention relates to a hydrogen absorbing alloy powder for use as a material for electrodes (negative electrodes) of metallic oxide-hydrogen batteries such as nickel-hydrogen batteries, and a process for producing the powder, and more particularly to the surface treatment of a hydrogen absorbing alloy powder.

BACKGROUND ART

Hydrogen absorbing alloy electrodes serving as the negative electrodes of nickel-hydrogen batteries are prepared by pulverizing a hydrogen absorbing alloy ingot to obtain a hydrogen absorbing alloy powder, admixing a binder with the powder and shaping the mixture in the form of the electrode. The hydrogen absorbing alloys heretofore developed include those of $AB_5$-type rare earths having a crystal structure of the $CaCu_5$, type, such Mm—Ni alloys, and $TiNi_2$ alloys having a Laves-phase structure of the C14-type or C15-type.

With the nickel-hydrogen batteries having a hydrogen absorbing alloy electrode as the negative electrode, a gas-phase reaction and an electrochemical reaction proceed at the same time on the surface of the hydrogen absorbing alloy owing to the contact of the alloy surface with an alkaline electrolyte. More specifically, in the relationship between the hydrogen pressure and the temperature, hydrogen is absorbed by the alloy, or the alloy desorbs hydrogen (gas-phase reaction). In the voltage-current relationship, on the other hand, application of voltage (charging) permits the alloy to absorb the hydrogen produced by the electrolysis of water, and the delivery of current (discharging) oxidizes hydrogen to form water (electrochemical reaction). The properties of the alloy surface are therefore important in improving the performance of the nickel-hydrogen battery.

Accordingly, to improve the activity of the hydrogen absorbing alloy for use in nickel-hydrogen batteries, it is conventional practice to immerse a hydrogen alloy powder in an aqueous acid solution for surface treatment as disclosed in JP-B-225975/1993, or in an aqueous alkaline solution for surface treatment as disclosed in JP-B-175339/1988. The surface treatment removes an oxide film formed in the surface layer portions of the alloy particles, permitting rare-earth elements (such as La) to dissolve out and forming a nickel- or cobalt-rich layer in the surfaces layer portions of the particles, whereby the alloy is given improved electrochemical catalytic activity.

However, we have found that the conventional surface treatment still fails to afford sufficient activity although forming the nickel- or cobalt-rich layer in the surface layer portions of the alloy particles.

An object of the present invention is to provide a hydrogen absorbing alloy powder having higher activity than conventionally, a process for producing the powder, a hydrogen absorbing alloy electrode wherein the power is used, and a metallic oxide-hydrogen battery comprising the electrode.

DISCLOSURE OF THE INVENTION

In producing a hydrogen absorbing alloy powder of the present invention, a starting hydrogen absorbing alloy powder containing nickel and cobalt is held in a high-temperature hydrogen atmosphere under the conditions of temperature, pressure and time sufficient to reduce oxides formed in a surface layer portion of each of the alloy particles 1, not melting the alloy particles 1 and not permitting the alloy particles to absorb hydrogen, and thereafter surface-treated with an acid or alkaline treating liquid. In this process, the temperature is in the range of 100° C. to 900° C., the pressure is in the range of 1 atm to 3 atm, and the time is in the range of 30 minutes to 10 hours. The acid treating liquid is, for example, a hydrochloric acid solution. The alkaline treating liquid to be used is at least one aqueous solution selected, for example, from among aqueous solution of KOH, aqueous solution of NaOH and aqueous solution of LiOH.

The hydrogen absorbing alloy powder obtained by the above production process is applied to an electrically conductive substrate and shaped in the form of an electrode to prepare a hydrogen absorbing alloy electrode of the invention.

The oxide film formed in the surface layer portions of the alloy particles 1 in the step of preparing the starting hydrogen absorbing alloy powder is reduced by the high-temperature hydrogen atmosphere (reduction treatment with high-temperature hydrogen) of the above process and thereby converted to a first metal-rich layer 3 which is enriched in metals (nickel and cobalt). Since the temperature, pressure and time for the treatment are adjusted to the respective ranges mentioned, the oxide film is fully reduced without the likelihood of the alloy particles 1 melting or absorbing hydrogen.

The alloy powder is thereafter subjected to a surface treatment with the acid or alkaline treating liquid, whereby oxides of rare-earth elements (such as La), or Al, etc. are allowed to dissolve out from a surface layer portion of the first metal-rich layer 3. A second metal-rich layer 4 further enriched in the metals (nickel and cobalt) is formed in the surface layer portion of the first metal-rich layer 3. The first metal-rich layer 3 is internally studded with relatively small clusters 30 of the metals (nickel and cobalt), while the second metal-rich layer 4 is visually found to be internally studded with many relatively large clusters 40 of the metals (nickel and cobalt).

According to the present invention, the first metal-rich layer 3 formed by the reduction treatment with high-temperature hydrogen and enriched in nickel and cobalt is treated with an acid or alkali to form the second metal-rich layer 4 which is further enriched in nickel and cobalt. The invention therefore affords higher activity than the prior art wherein an acid treatment or alkali treatment only is conducted.

The hydrogen absorbing alloys usable according to the invention are those having a crystal structure of the $CaCu_5$ type, and alloys having a Laves-phase structure of the C14-type or C15-type. Preferable to use are alloys having a crystal structure of the $CaCu_5$ type.

Examples of useful alloys having the $CaCu_5$-type crystal structure are those represented by $MmNi_2CoAlMn$ and obtained by substituting the La of $LaNi_5$ with Mm (misch metal) which is a mixture of rare-earth elements, i.e., alloys represented by the formula $MmNi_xM1_yM2_z$ (wherein Mm is a mixture of rare-earth elements, M1 is at least one element selected from among Co, Al and Mn, M2 is a transition metal different from M1, x is a positive real number, x, y and z are such that $4.7 \leq x+y+z \leq 5.4$).

Examples of useful alloys having a Laves-phase structure are those represented by $AB_2$ (wherein A is at least one of Ti and Zr, and B is at least one element selected from among Ni, Co, V, Mn, Fe and Cr). More specifically, $TiNi_2$ and $Ti_{0.5}Zr_{0.5}Ni_2$ are useful.

BRIEF DESCRIPTION OF THE DRAWINGS

FIG. 5 is a table showing the results obtained by analyzing the surface layer portion of the alloy particle to determine the compositions thereof;

FIG. 7 is a table showing the results of tests conducted to substantiate the advantage of the invention; and FIG. 8 is another table showing the results of the tests.

BEST MODE OF CARRYING OUT THE INVENTION

Figure 2:
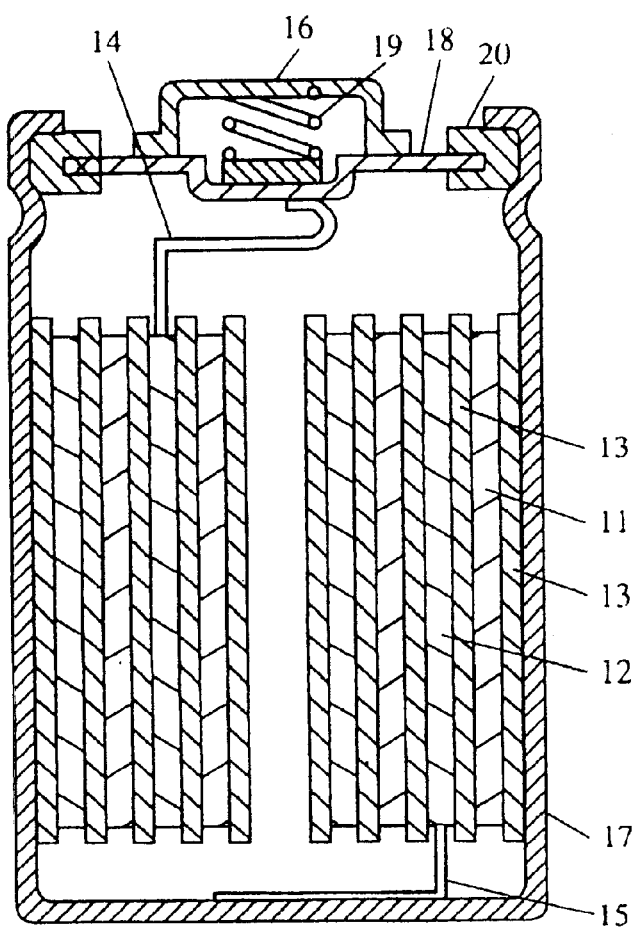
FIG. 2 is a sectional view showing an alkaline battery.

FIG. 2 shows the construction of a nickel-hydrogen battery (for example, 1000 mAh in battery capacity) of AA size and of the type wherein the positive electrode is dominant, and the present invention is to be practiced. The illustrated battery, which is an alkaline battery, has a closed construction comprising a positive electrode 11, negative electrode 12, separator 13, positive electrode lead 14, negative electrode lead 15, external positive terminal 16, can 17 serving also as a negative terminal, closure 18, etc. The positive electrode 11 and the negative electrode 12 are accommodated, as rolled up in a spiral form with the separator 13 interposed therebetween, in the can 17. The positive electrode 11 is connected by the lead 14 to the closure 18, and the negative electrode 12 by the lead 15 to the can 17. An insulating packing 20 is provided at the junction of the can 17 and the closure 18 to seal off the battery. A coiled spring 19 is interposed between the external positive terminal 16 and the closure 18. The spring 19 is compressed to release a gas from inside the battery to the atmosphere when the internal pressure of the battery builds up abnormally.

Figure 1:
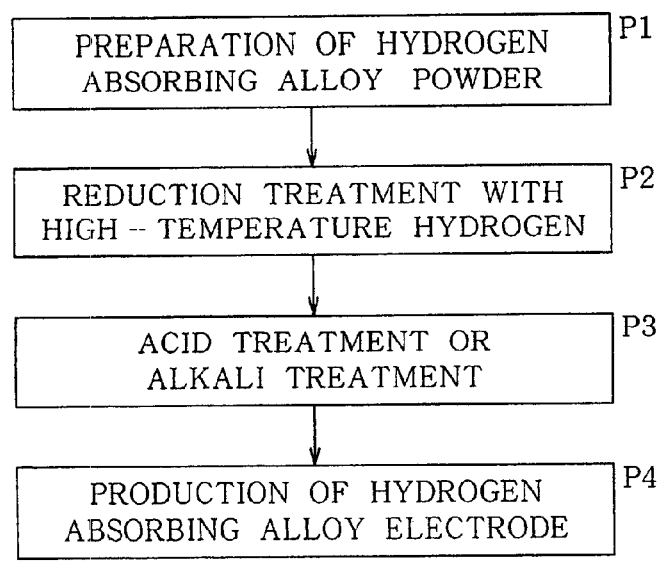
FIG. 1 is a scheme showing the process of the invention for producing a hydrogen absorbing alloy electrode.

A hydrogen absorbing alloy electrode for use as the negative electrode 12 is produced by the steps shown in FIG. 1.

First, a hydrogen absorbing alloy powder is prepared as specified in composition and particle size (step P1). For example, Mm, Ni, Co, Al and Mn are mixed together in the mole ratio of 1.0:3.1:1.0:0.3:0.6, and the mixture is melted in an arc melting furnace having an argon atmosphere and thereafter allowed to cool spontaneously to obtain an ingot of hydrogen absorbing alloy represented by the formula $MmNi_{3.1}CoAl_{0.3}Mn_{0.6}$. The ingot is mechanically pulverized in the air to obtain a hydrogen absorbing alloy powder having a mean particle size of 80 micrometers.

Next, the alloy powder is placed into a heat-resistant pressure-resistant container of stainless steel and heated at 300° C. after evacuation, hydrogen gas is then introduced into the container to 1.2 atm, and the powder is held in this state for 30 minutes. In this way, the alloy particles are subjected to a surface treatment (reduction treatment with high-temperature hydrogen, step P2).

The temperature, pressure and time for the reduction treatment with high-temperature hydrogen are not limited to the above values but are so determined that the oxide film formed in the surface layer portions of the alloy particles as will be described below can be fully reduced without permitting the particles to melt and to absorb hydrogen. The treatment is conducted, for example, at a temperature in the range of 100° C. to 900° C. and at a pressure in the range of 1.0 atm to 3.0 atm for 30 minutes to 10 hours.

Subsequently, the alloy powder resulting from the reduction treatment is immersed in an acid aqueous solution, for example, in a 0.5N hydrochloric acid solution (room temperature), at a pH of 0.3 for 2 hours, followed by suction filtration, washing with water and drying, whereby the powder is subjected to an acid treatment (step P3).

The acid aqueous solution is not limited to the hydrochloric acid solution; an aqueous solution having a strong acidity of 0.3 to 2.0 in pH can be used. For example, a sulfuric acid solution or nitric acid solution is usable. In view of the battery characteristics, the hydrochloric acid solution is more preferable than the sulfuric acid solution or nitric acid solution in that the aqueous solution is free from the sulfate radial ($So_4^{2-}$) or nitrate radical ($NO_3^{31}$).

The hydrogen absorbing alloy powder can be treated with an alkaline aqueous solution instead of the acid treatment. The alloy powder is immersed, for example, in a 30 wt. % aqueous solution of potassium hydroxide (80° C.), useful as an electrolyte, for 2 hours, followed by suction filtration and drying. The alkaline aqueous solution is not limited to the aqueous solution of potassium hydroxide but can be a strongly alkaline aqueous solution consisting predominantly of potassium hydroxide (KOH), such as an aqueous solution of KOH and LiOH, aqueous solution of KOH and NaOH or aqueous solution of KOH, NaOH and LiOH. An aqueous solution of LiOH and NaOH is also usable.

The hydrogen absorbing alloy powder resulting from the acid treatment is thereafter mixed with a 5 wt. % aqueous solution of a binder such as PEO (polyethylene oxide) in the ratio of 100:20 by weight to prepare a paste, which is applied to opposite surfaces of a substrate of punching metal plated with nickel, followed by drying at room temperature and cutting to a predetermined size, whereby a hydrogen absorbing alloy electrode is produced (step P4).

The electrode thus obtained is incorporated as the negative electrode into the nickel-hydrogen battery shown in FIG. 2. A sintered nickel electrode is usable as the positive electrode, an alkali-resistant nonwoven fabric as the separator, and a 30 wt. % aqueous solution of potassium hydroxide as the electrolyte.

Figure 3:
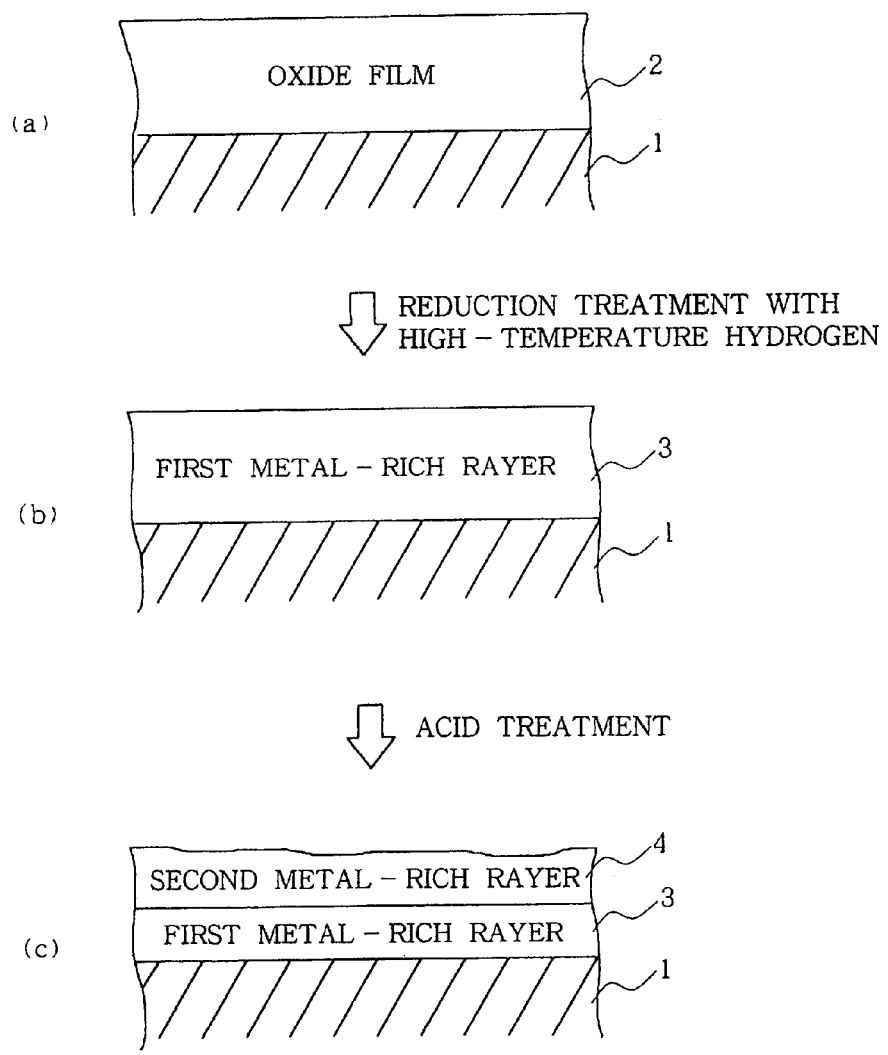
FIG. 3 is a diagram for illustrating the effect of a reduction treatment of the invention with high-temperature hydrogen.

In the process shown in FIG. 1 for producing the hydrogen absorbing alloy electrode, the surfaces of the alloy particles as prepared by step P1 come into contact with the air or the water in the air, with the result that an oxide film 2 of nickel oxide and cobalt oxide is formed in the surface layer portions of the alloy particles 1 as shown in FIG. 3, (a).

The oxide film 2 is thereafter reduced with high-temperature hydrogen in step P2 and thereby converted to a first metal-rich layer 3 which is enriched in nickel and cobalt as shown in FIG. 3, (b).

Further in step P3, rare-earth elements such as La dissolve out from a surface layer portion of the first metal-rich layer 3, with the result that a second metal-rich layer 4 further enriched in nickel and cobalt is formed in the surface layer portion of the first metal-rich layer 3.

Figure 4:
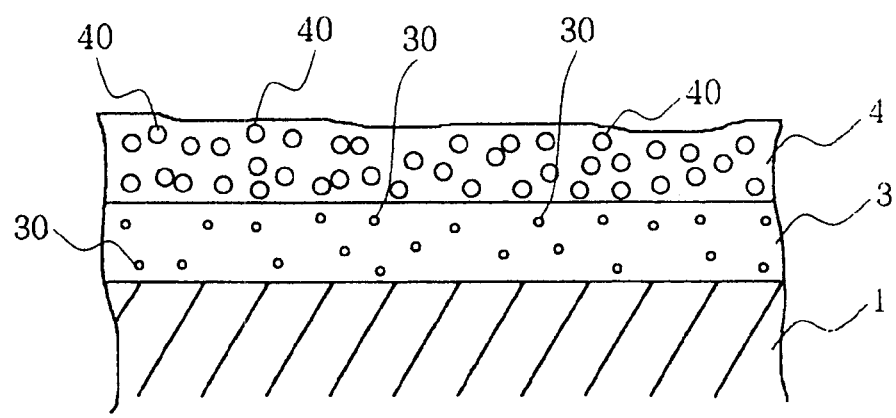
FIG. 4 is a diagram showing the structure of surface layer portion of a particle of hydrogen absorbing alloy embodying the invention.

FIG. 4 is a diagram schematically showing the surface layer portion of the alloy particle obtained by the above process, as observed under a transmission electron microscope. A sample was prepared by ion etching for the observation of the surface layer portion.

As illustrated, the first metal-rich layer 3 is internally studded with relatively small clusters 30 of nickel and cobalt, while the second metal-rich layer 4 is internally studded with many relatively large clusters 40 of nickel and cobalt. Thus, the second metal-rich layer 4 further enriched in nickel and cobalt is formed in the surface layer portion of the first metal-rich layer 3.

FIG. 5 shows the proportions of component elements (proportion, in atm %, of each component element in the entire composition of the layer) in the first metal-rich layer 3 and the second metal-rich layer 4 of the hydrogen absorbing alloy powder, as determined by energy dispersive X-ray analysis (EDX) using a field emission scanning transmission electron microscope (FESTEM).

The proportion of nickel (Ni) and the proportion of cobalt (Co) are both greater in the second metal-rich layer 4 than in the first metal-rich layer 3. This indicates that the second metal-rich layer 4 further enriched in nickel and cobalt is formed in the surface layer portion of the first metal-rich layer 3.

Thus, the first metal-rich layer 3 formed by the reduction treatment with high-temperature hydrogen and enriched in nickel and cobalt is treated with an acid to form the second metal-rich layer 4 which is further enriched in nickel and cobalt. The surface treating process of the invention therefore gives higher electrochemical catalytic activity to the hydrogen absorbing alloy electrode than the prior art wherein an acid treatment only is conducted.

FIGS. 7 and 8 show the results of tests conducted to substantiate the advantage of the surface treating process of the present invention.

Described below are preparation of a test device, test method and test results.

(1) Preparation of hydrogen absorbing alloy powders

Mm (a mixture of rare-earth elements), Ni, Co, Al and Mn (elemental metal with a purity of 99.9%) were mixed together in the mole ratio of 1.0:3.1:1.0:0.3:0.6, and the mixture was melted in an arc melting furnace having an argon atmosphere and thereafter allowed to cool spontaneously to obtain an ingot of hydrogen absorbing alloy represented by the formula $MmNi_{3.1}CoAl_{0.3}Mn_{0.6}$. The ingot was mechanically pulverized in the air to obtain a hydrogen absorbing alloy powder (untreated alloy powder 1) adjusted to a mean particle size of 80 micrometers.

A hydrogen absorbing alloy powder (untreated alloy powder 2) was also prepared with the same composition and mean particle size by the gas atomizing process.

(2) Preparation of alloy powders by reduction

Untreated alloy powders 1 and 2 were placed into respective heat-resistant pressure-resistant containers of stainless steel and heated at varying temperatures of 50° C. to 950° C. after evacuation, hydrogen gas was then introduced into the containers to 1.2 atm, and the powders were held in this state for 30 minutes to obtain alloy powders reduced with high-temperature hydrogen.

(3) Preparation of alloy powers treated with acid

Untreated alloy powders 1 and 2, and the reduced alloy powders were each immersed in a 0.5N hydrochloric acid solution (room temperature) at a pH of 0.3 for 2 hours, followed by suction filtration, washing with water and drying to obtain acid-treated alloy powders.

(4) Preparation of alloy powders treated with alkali

Untreated alloy powders 1 and 2, and the reduced alloy powders were each immersed in a 30 wt. % aqueous solution of potassium hydroxide (80° C.), which is for use as an electrolyte, for 2 hours, followed by suction filtration and drying to obtain alkali-treated alloy powders.

(5) Preparation of alloy electrodes

A 0.5 g quantity of each of various hydrogen absorbing alloy powders thus prepared was admixed with 0.1 g of PTFE, the mixture was applied to an expanded nickel porous body serving as a conductive substrate, and the body was then pressed at 1200 kgf/cm$^2$ for shaping, whereby a hydrogen absorbing alloy electrode was prepared in the form of a disk with a diameter of 20 mm.

(6) Assembly of test cells

Figure 6:
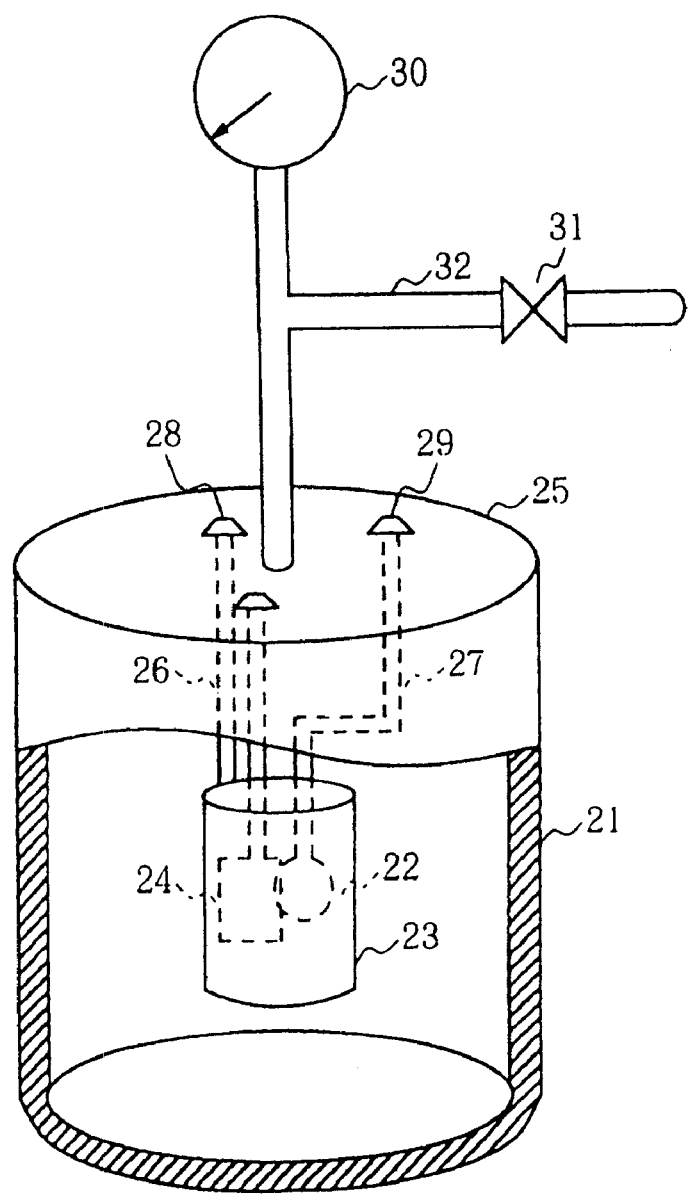
FIG. 6 is a perspective view partly broken away and showing the construction of a test cell.

The electrodes thus obtained were used as test electrodes (negative electrodes) to assemble test cells like the one shown in FIG. 6.

As illustrated, the test cell has arranged in an insulating closed container 21 of polypropylene a test electrode 22 which is the hydrogen absorbing alloy electrode to be tested, a sintered nickel electrode 23 in the form of a hollow cylinder and having a sufficiently greater electrochemical capacity than the test electrode 22, and a sintered nickel reference electrode 24 in the form of a plate. The nickel electrode 23 is supported by the lower end of a positive electrode lead 26 connected to the top wall 25 of the closed container 21. The test electrode 22 is vertically supported by the lower end of a negative electrode lead 27 connected to the top wall 25 of the container 21, and is accommodated inside the nickel electrode 23 centrally thereof.

The positive electrode lead 26 and the negative electrode lead 27 extend through the top wall 25 of the closed container and are exposed to the outside and connected to a positive terminal 28 and a negative terminal 29, respectively. The test electrode 22 and the sintered nickel electrode 23 are held immersed in an alkaline electrolyte (30 wt. % aqueous solution of potassium hydroxide). The closed container 21 is filled with nitrogen gas in a space above the alkaline electrolyte, whereby the test electrode 22 is subjected to a predetermined pressure (5 atm). Connected to the center portion of the top wall 25 of the closed container 21 is a relief pipe 32 equipped with a pressure gauge 30 and a relief valve 31 for preventing the internal pressure of the container 21 from increasing above a predetermined value.

(7) Assembly of alkaline batteries

Each hydrogen absorbing alloy powder and a 5 wt. % aqueous solution of PEO (polyethylene oxide) were mixed together in the ratio of 100:20 by weight to prepare a paste, which was applied to opposite surfaces of punching metal (conductive substrate) plated with nickel, followed by drying at room temperature and cutting to a predetermined size, to prepare a hydrogen absorbing alloy electrode. A nickel-hydrogen battery (1000 mAh in battery capacity) of AA size and of the type wherein the positive electrode is dominant shown in FIG. 2 was then assembled using the electrode as the negative electrode. A sintered nickel electrode was usable as the positive electrode, an alkali-resistant nonwoven fabric as the separator, and a 30 wt. % aqueous solution of potassium hydroxide as the electrolyte.

(8) Charge-discharge cycle test

At room temperature, each test cell was charged at 50 mA/g for 8 hours, then held at rest for 1 hour, subsequently discharged at 50 mA/g to a final discharge voltage of 0.9 V and thereafter held at rest for 1 hour. This charge-discharge cycle was repeated, and the discharge capacity (mAh/g) was measured every cycle.

In the case of the alkaline batteries, each battery was charged with current of 0.2 C for 6 hours and thereafter discharged at current of 0.2 C to 1.0 V at room temperature to determine the initial discharge capacity (discharge capacity of the first cycle).

(9) Measurement of electric resistance value

Each hydrogen absorbing alloy powder was checked for electric resistance value under the conditions of mean particle size of 35 micrometers, pressure of 350 kgf/cm$^2$, test jig inside diameter of 12 mm and powder weight of 5 g.

(10) Test results

FIGS. 7 and 8 shows the results of the test.

FIG. 7 shows the initial discharge capacity (discharge capacity 1) of each test cell, and the initial discharge capacity (discharge capacity 2) of each alkaline battery. Alloy electrodes A1 to A6 are those prepared from the hydrogen absorbing alloys subjected to the reduction treatment with high-temperature hydrogen at 300° C. Alloy electrodes B1 to B6 are those obtained from the hydrogen absorbing alloys not treated for reduction. Alloy electrodes A1 to A6 which are treated for reduction are 285 mAh/g to 299 mAh/g in discharge capacity 1 and 820 mAh to 865 mAh in discharge capacity 2, whereas alloy electrodes B1 to B6 which are not treated for reduction are 170 mAh/g to 246 mAh/g in discharge capacity 1 and 580 mAh to 675 mAh in discharge capacity 2. Thus, the alloy electrodes are greater in both discharge capacities and more highly activated initially when treated for reduction than otherwise.

Alloy electrodes A1 to A6 treated for reduction include those acid-treated or alkali-treated after the reduction treatment, and those treated neither with acid nor with alkali after the reduction. Acid-treated alloy electrodes A2 and A5 are 295 mAh/g and 299 mAh/g, respectively, in discharge capacity 1, and 860 mAh and 865 mAh, respectively, in discharge capacity 2. Alkali-treated alloy electrodes A3 and A6 are 290 mAh/g and 296 mAh/g, respectively, in discharge capacity 1, and are both 855 mAh in discharge capacity 2. On the other hand, untreated alloy electrodes A1 and A4 are 285 mAh/g and 292 mAh/g, respectively, in discharge capacity 1, and 820 mAh and 840 mAh, respectively, in discharge capacity 2. Thus, the acid-treated or alkali-treated alloy electrodes are greater in both discharge capacities 1 and 2.

Accordingly, although the reduction treatment with high-temperature hydrogen, even when singly conducted, results in great discharge capacities as described above, further enhanced effects are available when the acid treatment or alkali treatment, preferably acid treatment, is carried out after the reduction treatment.

FIG. 7 reveals that the alloy electrode of the invention (A2 or A3) subjected to the reduction treatment and the acid treatment is given higher activity than the conventional alloy electrode (B2 or B3) which is subjected to the acid treatment only.

Alloy electrodes A1 to A3 and B1 to B3 are prepared from the alloy powder which is obtained by mechanically pulverizing an ingot made by an argon arc furnace, while alloy electrodes A4 to A6 and B4 to B6 are prepared from the alloy powder obtained by the gas atomizing process. These two groups of electrodes will be compared in discharge capacities 1 and 2, as divided in two cases depending on whether the alloy is treated for reduction with high-temperature hydrogen or otherwise. In the case where no reduction treatment is conducted, alloy electrodes B1 to B3 are 222 mAh/g to 246 mAh/g in discharge capacity 1 and 620 mAh to 675 mAh in discharge capacity 2, while alloy electrodes B4 to B6 are 170 mAh/g to 221 mAh/g in discharge capacity 1 and 580 mAh to 620 mAh in discharge capacity 2. Thus, alloy electrodes B1 to B3 prepared with use of the argon arc furnace are greater in both discharge capacities 1 and 2.

In the case where the reduction treatment is conducted, on the other hand, alloy electrodes A1 to A3 are 285 mAh/g to 295 mAh/g in discharge capacity 1 and 820 mAh to 860 mAh in discharge capacity 2, while alloy electrodes A4 to A6 are 292 mAh/g to 299 mAh/g in discharge capacity 1 and 840 mAh to 865 mAh in discharge capacity 2. Thus, alloy electrodes A4 to A6 prepared by the gas atomizing process are greater in both discharge capacities 1 and 2.

Accordingly, it is advantageous to prepare the alloy powder by the gas atomizing process in respect of the initial activity in the case where the reduction treatment is conducted with high-temperature hydrogen.

Furthermore, alloy electrodes A1 to A6 treated for reduction are lower than alloy electrodes B1 to B6 not treated for reduction in the resistance value of the powder as measured under the conditions of particle size of 35 micrometers, pressure of 350 kgf/cm$^2$, measuring jig inside diameter of 12 mm and powder weight of 5 g. This substantiates that the alloy particles are formed, in their surface layer portions with a metal-rich layer having higher nickel and cobalt contents than in the alloy electrode not treated for reduction with high-temperature hydrogen.

FIG. 8 shows the results obtained by measuring discharge capacities 1 and 2 of alloy electrodes which were prepared from the alloy powder made with use of an argon arc furnace and the alloy powder obtained by the gas atomizing process after subjecting the powders to the reduction treatment with high-temperature hydrogen at varying temperatures of 50° C. to 950° C.

The alloy electrodes prepared with use of the argon arc furnace are as great as at least 284 mAh/g in discharge capacity 1 and at least 820 mAh/g in discharge capacity 2 when the temperature for the reduction treatment is in the range of 100° C. to 900° C.

The alloy electrodes prepared by the gas atomizing process are as great as at least 288 mAh/g in discharge capacity 1 and at least 835 mAh/g in discharge capacity 2 when the temperature for the reduction treatment is in the range of 100° C. to 900° C.

For the alloys thus used for testing, it is suitable that the temperature for the reduction treatment be in the range of 100° C. to 900° C. under the conditions of pressure of 1.2 atm and time period of 30 minutes regardless of whether the argon arc furnace or the gas atomizing process is used. If the reduction treatment temperature is at least 100° C., the equilibrium hydrogen pressure of the hydrogen absorbing alloy rises to suppress the absorption of hydrogen by the alloy.

INDUSTRIAL APPLICABILITY

The hydrogen absorbing alloy power embodying the invention is suitable as a material for electrodes of metallic oxide-hydrogen batteries, for example, as a material for the negative electrodes of nickel-hydrogen batteries.

What is claimed is:

1. A hydrogen absorbing alloy electrode comprising an electrically conductive substrate having applied thereto a hydrogen absorbing alloy powder, the electrode being characterized in that the hydrogen absorbing alloy powder contains nickel and cobalt, the alloy particles (1) being formed each in a surface layer portion thereof with a metal-rich layer (3) enriched in metals by a reduction treatment with hydrogen, the metal-rich layer (3) being surface-treated with an acid or alkaline treating liquid.

2. A hydrogen absorbing alloy electrode according to claim 1 wherein the acid treating liquid is a hydrochloric acid solution.

3. A hydrogen absorbing alloy electrode according to claim 1 wherein the alkaline treating liquid is at least one aqueous solution selected from among an aqueous solution of KOH, aqueous solution of NaOH and aqueous solution of LiOH.

4. A metallic oxide-hydrogen battery wherein a hydrogen absorbing alloy electrode is used which comprises an electrically conductive substrate having applied thereto a hydrogen absorbing alloy powder, the metallic oxide-hydrogen battery being characterized in that the hydrogen absorbing alloy powder contains nickel and cobalt, the alloy particles (1) being formed each in a surface layer portion thereof with a metal-rich layer (3) enriched in metals by a reduction treatment with hydrogen, the metal-rich layer (3) being surface-treated with an acid or alkaline treating liquid.

5. A metallic oxide-hydrogen battery according to claim 4 wherein the acid treating liquid is a hydrochloric acid solution.

6. A metallic oxide-hydrogen battery according to claim 4 wherein the alkaline treating liquid is at least one aqueous solution selected from among an aqueous solution of KOH, aqueous solution of NaOH and aqueous solution of LiOH.

* * * * *